United States Patent [19]

Meyer et al.

[11] 4,284,745

[45] Aug. 18, 1981

[54] CROSS-LINKABLE SATURATED POWDEROUS COMPOSITIONS AND POWDEROUS PAINTING AND COATING COMPOSITIONS CONTAINING SAME

[75] Inventors: Jacques Meyer, Paris; Daniel Bernelin, Ris-Orangis, both of France

[73] Assignee: Rhone-Poulenc Industries, Paris, France

[21] Appl. No.: 24,008

[22] Filed: Mar. 26, 1979

Related U.S. Application Data

[62] Division of Ser. No. 833,953, Sep. 16, 1977, Pat. No. 4,182,840.

[30] Foreign Application Priority Data

Sep. 22, 1976 [FR] France ............................... 76 28415
May 9, 1977 [FR] France ............................... 77 14039
Jul. 11, 1977 [FR] France ............................... 77 21240

[51] Int. Cl.$^3$ ..................... C08G 63/76; C08G 18/82; C08G 59/16
[52] U.S. Cl. ................................. 525/408; 260/18 R; 260/40 R; 427/27; 428/423.1; 428/425.8; 525/438; 525/440; 525/533; 525/437; 528/45; 528/413; 528/414; 528/416; 528/419; 528/902; 525/453; 525/403; 525/523
[58] Field of Search .................. 525/438, 533, 437

[56] References Cited

U.S. PATENT DOCUMENTS

| | | | |
|---|---|---|---|
| 3,555,111 | 1/1971 | Benham et al. | 525/533 |
| 3,624,032 | 11/1971 | Myashiro et al. | 525/533 |
| 3,639,345 | 2/1972 | Whittemore et al. | 525/533 |
| 3,937,751 | 2/1976 | Schmid et al. | 525/438 |
| 3,968,135 | 7/1976 | Steele et al. | 525/533 |
| 4,013,987 | 3/1977 | Foster | 525/533 |
| 4,087,479 | 5/1978 | Toyota et al. | 260/835 |
| 4,092,295 | 5/1978 | Takamori et al. | 525/438 |
| 4,101,518 | 7/1978 | Takamori et al. | 525/438 |
| 4,112,012 | 9/1978 | de Cleur et al. | 525/438 |
| 4,113,791 | 9/1978 | Smith et al. | 525/533 |
| 4,119,679 | 10/1978 | Nishizawa et al. | 525/438 |
| 4,129,488 | 12/1978 | McGinniss | 525/438 |
| 4,145,370 | 3/1979 | Sreeves | 525/438 |
| 4,169,006 | 9/1979 | Matsubara et al. | 525/438 |
| 4,192,786 | 3/1980 | Shibayama et al. | 525/533 |

*Primary Examiner*—H. S. Cockeram
*Attorney, Agent, or Firm*—Burns, Doane, Swecker & Mathis

[57] ABSTRACT

A saturated cross-linkable binder composition adapted for preparing coatings having a non-glossy surface is disclosed which comprises:

(a) at least one cross-linkable resin selected from the group consisting of saturated polyester resins and epoxide resins;

(b) a cross-linking agent wherein the functional groups are selected from the group consisting of acid groups and acid anhydride groups and, in case the cross-linkable resin is a saturated polyester resin, also masked isocyanate groups; and, (c) having associated therewith a salt of an at least bivalent metal ion and an organic acid anion selected from the group consisting of carboxylic anions and acetylacetonate.

These binder compositions are particularly useful as binding agents in powderous paint compositions which yield a paint coating having a non-glossy and textured surface.

24 Claims, No Drawings

CROSS-LINKABLE SATURATED POWDEROUS COMPOSITIONS AND POWDEROUS PAINTING AND COATING COMPOSITIONS CONTAINING SAME

This is a division of application Ser. No. 833,953, filed Sept. 16, 1977, now U.S. Pat. No. 4,182,840 issued Jan. 8, 1980.

BACKGROUND OF THE INVENTION

1. Field of the Invention

The present invention relates to saturated cross-linked compositions and their preparation and, particularly to powderous binders for paints and coatings containing such compositions.

2. Description of the Prior Art

In the painting industry, powderous compositions are conventionally used, wherein the binder may consist of a polyester resin or an epoxide resin usually in combination with a crosslinking agent. If the polyester resin is used in combination with a cross-linking agent, wherein the functional groups are acid anhydride- and/or acid groups or masked isocyanate groups, or a cross-linking agent which is a compound derived from hexamethylol melamine, the number of hydroxyl groups predominates over the number of carboxyl groups within the polyester. If the cross-linking polyester is used without a cross-linking agent, it polycondensates with itself during the final utilization, and consequently the contents in hydroxyl groups and in carboxyl groups are more or less equal. If in the composition, the binder comprises a cross-linkable epoxide resin, the latter is combined with a cross-linking agent wherein the functional groups are acid anhydride- and/or acid groups.

The powderous painting compositions usually contain a certain amount of pigments and specific adjuvants such as spreading agents, catalysts, and coloring agents. The ratio between the amount of pigment and the amount of binder varies within a large range. The preparation of the compositions usually comprises separately preparing the binder and the crosslinking agent, optionally mixing the same at a temperature which is lower than the temperature at which the two components may react with each other, mixing the compounds of which the binder is comprised with the adjuvants by melting at a relatively low temperature, grinding the resulting mixture, and selecting a fraction of a certain particle size.

Then the final composition is distributed in powderous form onto a metal article, usually by means of an electrical pistol, then the coated article is heated in an oven to a temperature which favorizes the melting and spreading of the composition and the subsequent cross-linking of the binder. In this way, a smooth and glossy coating which exhibits favorable physical properties may be obtained. Yet, more and more, the painting industry requires compositions which, after baking, are able to provide a textured, non-glossy, mat or satin surface. A conventional process for achieving this purpose usually comprises introducing at least one mineral component, the particle distribution of which is chosen depending on the desired effect, into the composition in addition to the pigment. This process has important disadvantages in several aspects, namely: a high content of materials which are opposite to a good spreading of the binder, and at the upper limit may cause a lack of cohesion of the film or paint, poor mechanical properties, considerable defects with regard to adherence, and a poor resistency against solvents or aging.

The German Patent Application Ser. No. 2,351,176 discloses a composition for powderous coatings which comprises a saturated thermoplastic polyester resin which includes particles of cellulose esters which are intended to provide a mat and textured surface upon melting. Yet, this composition is not cross-linked. It necessitates a high baking temperature and its cellulose ester content is very high, which renders the resulting coating sensitive to the usual solvents. Therefore, the industry is in need of compositions which can be used as powderous binders in paints, and provide the cross-linked coating having a textured, non-glossy surface which does not exhibit the defects and insufficiencies of the heretoknown compositions.

SUMMARY OF THE INVENTION

It is an object of the present invention to provide powderous compositions which are useful as paint binders and which permit to obtain a paint coating having a non-glossy and textured surface.

It is a further object of the present invention to provide such a composition which yields such a coating which exhibits an excellent resistency against solvents.

It is a further object to provide such a composition which yields a coating that exhibits a long life time and an excellent behavior under the influence of atmospheric agents and/or under ultraviolet irradiation.

It is still a further object of the present invention to provide such a composition, which yields a coating which exhibits good mechanical properties, in particular, a good resistency against folding, bending, beating, shock and a good resiliency.

It is a further object of the present invention to provide such a composition which provides for a strong adherence and cohesion of the resulting coating.

It is yet a further object of the present invention to provide such a composition which does not require temperatures of above 220° C. for forming the cross-linked coating.

In order to accomplish the foregoing objects according to the present invention, there is provided a powderous homogeneous saturated cross-linkable binder composition adapted for coatings having a non-glossy surface comprising:

(a) at least one cross-linkable resin selected from the group consisting of saturated polyester resins and epoxide resins;

(b) a cross-linking agent wherein the functional groups are selected from the group consisting of acid groups and acid anhydride groups and, in case the cross-linkable resin is a saturated polyester resin, also masked isocyanate groups; and, (c) having associated therewith a salt of an at least bivalent metal ion and an organic acid anion selected from the group consisting of carboxylic anions and acetylacetonate.

The metal salt of the organic acid may either be a separate compound which is admixed with the cross-linkable resin and the cross-linking agent or the organic acid anion thereof may be derived from at least part of such cross-linking agent molecules, wherein the functional groups are acid- or acid anhydride groups. The composition may further comprise a polyester derivative which is infusible at 150° C. and which may be a crystalline fraction of a crystallizable saturated cross-linkable polyester or a reaction product of a saturated cross-linkable polyester and the cross-linking agent.

According to the present invention, there are further provided powderous coatings and paint compositions comprising the above binding compositions and suitable adjuvants such as pigments, fillers, spreading agents, coloring agents, catalysts, and the like, which yield a mat, non-glossy coating having a textured surface.

According to the present invention, there are further provided processes for preparing the above compositions and for preparing a non-glossy coating therefrom.

Other objects, features and advantages of the present invention will become apparent to those skilled in the art from the detailed description which follows.

DETAILED DESCRIPTION OF THE INVENTION

The saturated cross-linkable resins which are used within the present invention are selected from saturated polyester resins and epoxy resins.

The polyester resins which may be part of the compositions according to the present invention are known products which are prepared according to conventional methods by reacting a carboxylic acid containing at least two carboxylic groups or their lower alkyl esters with an alcohol containing at least two hydroxy groups, whereby the ratio between the acid and the alcohol is chosen depending on the desired acid number and hydroxy number of the polyester resin. Suitable carboxylic acids comprise aromatic and saturated aliphatic dicarboxylic acids containing up to 12 carbon atoms, and optionally in admixture therewith, aromatic and saturated aliphatic polycarboxylic acids containing up to 12 carbon atoms. Among these carboxylic acids, aromatic dicarboxylic acids such as phthalic acids, e.g., terephthalic acid is preferred.

These aromatic dicarboxylic acids or mixtures thereof may be used as such or in admixture with saturated aliphatic dicarboxylic acids, such as adipic acid or sebacic acid. Furthermore, saturated polycarboxylic acids which contain more than two functional groups may be combined with dicarboxylic acids in order to obtain a partially branched polyester, yet without rendering the polyester infusible. Examples of suitable carboxylic acids containing more than two functional groups are tri- or tetracarboxylic acids, e.g., aromatic tricarboxylic acids, such as trimellitic acid or its anhydride or pyromellitic acid, or lower aliphatic acids, such as butene tetracarboxylic acid.

Suitable alcohols comprise aliphatic diols, such as lower alkylene diols, e.g., ethylene glycol, propylene glycol, butane diols, neopentyl glycol, or hydrogenated bisphenol A, and diols containing ether bridges, such as di- or trimers of the above lower alkylene diols or mixtures thereof, and optionally lower dihydroxy aryl compounds, e.g., a diethylene glycol-, dipropylene glycol-, or dihydroxy diethyl ether of bisphenol A. The above diols or mixtures thereof can be used within the polyesters according to the present invention. Furthermore, polyols which contain more than two functional groups may be combined with the above diols. Suitable such polyols are lower alkyl tri- to hexaols, such as glycerine, trimethylol propane, pentaerythritol, and trihydroxy ethyl isocyanate. Evidently, the amount of polyacids and/or polyols containing more than two functional groups have to be limited such, that these compounds do not cause an elevated degree of cross-linking and consequently, formation of an infusible product. The maximum proportion of monomers having more than two functional groups is determined as a function of the advancement of the reaction according to the theory of Flory (for the subject matter, see T. Alfrey, Mechanical Behavior of High Polymers, Interscience Publishers, volume VI, page 268).

Generally spoken, the saturated polyesters, which are used within the composition of the present invention, are solid substances, the softening point of which as determined by the ball-and-ring method is in the range of between about 50 and about 130° C., and which exhibit a hydroxyl number of from about 40 to about 200, preferably from about 50 to about 180, and an acid number of less than 10.

The epoxide resins which may be used within the present invention are known condensation products of epihalohydrins, such as epichlorohydrin, with diphenols which are prepared according to conventional processes. Suitable diphenols are lower aryl- and lower diaryl alkylene compounds containing two phenolic hydroxyl groups, e.g., lower di(hydroxyphenol) alkylenes, such as 2,2-di(4-hydroxyphenol) propane. The epoxide resins which are used within the compositions of the present invention are solid substances, the melting point of which as determined by the ball-and-ring method is in the range of between about 50 and about 120° C., and which exhibit an epoxy value of from about 400 to about 1,500.

The cross-linking agents which are used within the compositions according to the present invention are known compounds which contain functional groups which are capable of reacting with the reactive groups within the above resins.

In the event that an above defined saturated polyester resin is used as a resin component, the functional groups within the cross-linking agent comprise:

(a) acid anhydride- and/or acid groups; and,
(b) masked isocyante groups.

Suitable cross-linking agents containing acid anhydride- and/or acid groups comprise reaction products of an aliphatic diol containing from 2 to about 10, preferably 2 to about 8, carbon atoms with a polycarboxylic acid or an anhydride derivative thereof containing at least one carboxylic acid group and at least one acid anhydride group, or at least three carboxylic acid groups, two of which are susceptible of forming an anhydride group. Examples of suitable polycarboxylic acids and their anhydride derivatives comprise lower saturated or unsaturated aliphatic or aromatic tri- and tetracarboxylic acids or their anhydrides, such as tricarballylic acid, trimellitic acid anhydride, pyromellitic acid dianhydride, and butane tetracarboxylic acid.

Examples of such cross-linking agents are disclosed in the French Patent Application No. 75.42685, the disclosure of which is hereby incorporated by reference. If trimellitic acid anhydride is used as a reactive compound for preparing the crosslinking agent, the molar ratio between the trimellitic acid anhydride and the aliphatic diol may vary between about 2/1 and about 2/1.8. The reaction between the diol and the trimellitic acid anhydride is effected at a temperature of between about 180° and 250° C. until the water formation has stopped.

The cross-linking agents containing masked isocyanate groups comprise reaction products of diisocyanates, preferably cyclic diisocyanates containing up to 15 carbon atoms, e.g., aromatic diisocyanates such as tolylene diisocyanate or non-aromatic diisocyanates such as isophoron diisocyanate, and polyols, preferably lower alkyl di- to hexa-ols, such as ethylene glycol, trimethylol propane and pentaerythritol which are further reacted with ε-caprolactam, for example the commercially available isophoron diisocyanate reaction product ADDUCT B 1065 (manufacturer, VEBA). These products are prepared according to conventional methods, usually by progressively adding the polyol to the isocyanate which has been heated to a temperature of between about 80° and 100° C. under an atmosphere of neutral gas and under sufficient cooling to maintain a temperature of below 100° C. inside the reactor, then maintaining the reaction mixture at a temperature of about 100° C. for one hour after the addition of polyol has been finished, and then progressively introducing into the reaction mixture an amount of solid ε-caprolactam which is stoichiometrically equal to the number of remaining free isocyanate groups in such a manner that the temperature within the reactor does not exceed 125° C. The reaction mixture is then maintained at 125° C. for another hour, then the resulting viscous product is cooled in order to obtain a solid substance, the softening point of which as determined by the ball-and-ring method is between about 70° and about 130° C.

In the event that an above defined epoxide resin is used as a resin component within the composition according to the present invention, the corresponding cross-linking agent is a cross-linking agent as defined above, wherein the functional groups are acid anhydride and/or acid groups.

Further to the above defined saturated cross-linkable resins and cross-linking agents, the compositions according to the present invention comprise, associated with the resin and the cross-linking agent, a carboxylic acid salt or an acetylacetonate of an at least bivalent metal ion, which may either be a separate compound admixed with the above components or may be part of a cross-linking agent molecule.

In the case that the carboxylic salt of the at least bivalent metal ion is a separate compound, there are no particular limitations or requirements with regard to the organic acid from which the carboxylate anions within the salt of at least the bivalent metal ion are derived.

For example, aliphatic, aromatic or cycloalkyl mono- or polycarboxylic acids containing from 2 to about 25, preferably from about 6 to about 20 carbon atoms, can be used. The polycarboxylic acids preferably contain 2 to 4 carboxylic groups. Particularly preferred organic acid anions are the anions of undecanoic acid, stearic acid, acetylacetonic acid, naphthenic acids or phthalic acids.

According to a preferred embodiment of the present invention, the organic acid anion is provided by a functional group of such a cross-linking agent wherein the functional groups are acid anhydride and/or acid groups. According to this embodiment, the organic salt of the at least bivalent metal ion is obtained by reacting at least a part of said cross-linking agent with an active inorganic compound of the at least bivalent metal. Preferably, said inorganic metal compound is the oxide or the hydroxide of said metal. Prior to its reaction with the cross-linking agent, the active inorganic metal compound is dried at a temperature at which it does not lose its activity. For example, the compound may be dried at about 120° C. for about 2 hours.

According to this embodiment of the present invention, at least a part of the cross-linking agent is reacted with said active metal compound. The reaction may be carried out as follows: The cross-linking agent is introduced into a reactor provided with an agitating means and a heating means and is molten at a temperature of between about 170° and about 220° C., preferably of between about 180° and about 200° C. Then the inorganic active metal compound which has been dried as is describe above is introduced. Subsequently, this temperature is maintained, and the content of the reactor is agitated for a period of time of preferably more than 1 hour. The resulting product is then poured from the reactor, cooled and ground. According to an embodiment of this process, it is possible to react only a portion of the cross-linking agent with the metal compound. In this case, said portion preferably is less than 50% by weight of the total amount of cross-linking agent within the composition.

There are no restrictions as to what type of the at least bivalent metal ion is used in the organic acid metal salt. Preferred are bivalent or trivalent ions of readily available metals. For practical and economical reasons, the following metals are the most preferred: calcium, zinc, magnesium, lead, and aluminum. The amount of the above defined metal salt in the composition according to the present invention preferably is equivalent to a by-weight ratio between the metal ion and the saturated cross-linkable resin of from about 0.1/100 to about 1.5/100, preferably from about 0.3/100 to about 1.0/100.

According to another embodiment of the present invention, in addition to at least one of the above saturated polyesters, the cross-linking agent and the above defined organic metal salt associated therewith, the composition further comprises an organic fraction which is infusible at 150° C. and is obtained from at least one of the above polyesters or from a mixture of at least one of the above polyesters and the above cross-linking agents.

According to the first variant of this embodiment, said organic fraction which is infusible at 150° C. is a crystalline fraction of a saturated crystallizable and cross-linkable saturated polyester of the composition. The term "a crystallizable and cross-linkable saturated polyester" as used in this specification is meant to connote a polyester which does not contain any double bonds which are copolymerizable with vinylic monomers, and which is obtained by reacting at least one symmetrical diol, which is selected from the group consisting of unsubstituted straight chain lower alkylene glycols, such as ethylene glycol, trimethylene glycol, butane-1,4-diol, and hexamethylene glycol, and lower alkylene glycols containing two lower alkyl substituents fixed to the same carbon atom, such as neopentyl glycol, or mixtures thereof, with at least one symmetrical saturated dicarboxylic acid such as succinic acid, terephthalic acid and the like.

According to the above cited, difunctional reactants are replaced by tri- or polyfunctional reactants containing hydroxy groups or carboxylic groups such as trimethylpropane, trimellitic acid anhydride butane, tetracarboxylic acid and the like. The maximum proportion of polyfunctional reactants is determined by means of the theory according to Flory. The crystallizable polyesters are prepared according to conventional polycondensation methods, usually at a temperature of above 180° C. Cooling of the resin rapidly to ambient temperature yields an amorphous and vitreous resin, the softening point of which is between about 70° and about 130° C., as determined according to the ball-and-ring method.

Subsequently, a partial or complete crystallization of the resin is caused by a thermal treatment at a temperature of between about 80° and about 150° C., preferably of between about 100° and 130° C. during a period of time of usually between about 1 and about 20 hours, preferably between about 2 and about 10 hours. In order to accelerate the crystallization and to modify the dimensions of the crystals, a compound which is susceptible of promoting the crystallization, such as microcrystals of a polyester of the same type or finely divided solids in the form of fibers or fine particles, such as asbestos, may be introduced into the resin in the molten state prior to the thermal treatment. According to a further method, the crystallization of the resin is promoted by cooling it slowly from its polycondensation temperature to ambient temperature, for example, by pouring the liquid resin into containers forming a relatively thick layer, e.g., the thickness of which is in the range of about 50 to about 150 mm. The occurrence of a crystalline phase can be proved, e.g., by enthalpic differential analysis (AED). The thus obtained crystallized product is cooled and ground.

Of course, according to a preferred embodiment of the present invention, the saturated cross-linkable polyester may be a saturated cross-linkable and crystallizable resin yet which has not been subjected to the treatment which is needed for its crystallization.

This saturated cross-linkable and crystallizable resin would then be included in the above cited general definition of the resins.

According to the secondly mentioned variant of this embodiment, said fraction which is infusible at 150° C. is a cross-linked fraction which is obtained from the reaction of at least one of the above saturated polyesters and the cross-linking agents used within the composition. The cross-linked fraction is prepared by melting the polyester, or at least one of the polyesters used in the composition and mixing the molten polyester with the cross-linking agent or at least one of the cross-linking agents used in the composition as defined above at a temperature of between about 90° and about 180° C., preferably between about 110° and about 150° C., for a period of time of between about 1 and about 30 minutes. The progressing of the cross-linking can be determined by determining the mixture which contains any components which are insoluble in boiling chloroform. As soon as insoluble components occur, the resulting mixture is rapidly poured from the reactor and cooled, and then is coarsely ground.

The by-weight ratio between the amount of the organic fraction which is infusible at 150° C. and the amount of fusible polyester resin according to the present invention may vary within a wide range, e.g., from about 0.1 to about 90 parts per 100 parts of fusible resin depending on the desired effect. However, the preferred ratio is from about 1 to about 20 parts per 100 parts of resin which is fusible at 150° C.

The compositions according to the present invention can be cross-linked by polyaddition and/or polycondensation at a temperature of between about 160° and about 220° C., and the crosslinking time may vary within a period of between about 5 and about 40 minutes. The by-weight ratio between the saturated resin and the cross-linking agent may vary depending on hydroxyl numbers in case of a polyester resin or the epoxy value in case of an epoxy resin and the number of acid and/or anhydride equivalents or isocyanate equivalents in the cross-linking agent. Usually, such a by-weight ratio is chosen which provides for an overall equilibrium within the final compositions between the number of active functional groups of the saturated resin and the number of active functional groups of the cross-linking agent.

Powderous painting formulations which comprise the compositions according to the present invention may further contain conventional adjuvants which are well known in the painting industry, e.g., such as, pigments, coloring agents and fillers. Furthermore, conventional spreading agents may be incorporated, e.g., such as, acrylic polymers or silicon oils.

For preparing powderous painting formulations according to the present invention, the coarsely powdered components of the binding composition are thoroughly mixed with the adjuvants and fillers by melting the mixture in a conventional mixer, such as a mixer of the tradename Banbury or Buss, at an elevated temperature not exceeding 120° C., e.g., at a temperature of between about 60° and about 120° C., preferably of between about 80° and about 110° C. Then the mixture is cooled and finely ground, e.g., to a particle size of between about 20 and about 100 microns, and then is passed through a sieve. The resulting mixtures can be applied to previously de-fatted thermally resistant materials, such as metal or ceramical objects, by means of conventional methods, e.g., by a fluid bed technique or by electrostatical pulverizing. Subsequently, the cross-linking is effected at a temperature of between about 150° and about 220° C. for a period of between about 5 and about 40 minutes. The average thickness of the resulting coating on the support material is usually between about 30 and about 70 microns.

From the compositions according to the present invention, cross-linked coatings which exhibit a textured non-glossy surface may be obtained. The gloss, or brilliance, of the coating is determined by measuring the reflected portion of an incident light, and is expressed as the percentage of the intensity of the reflected light in the normal direction of reflection relative to the intensity of a light which is incident under an angle of 60°, by means of a reflection apparatus from Gardner Laboratories.

A gloss value of 0% corresponds to a black body and a gloss value of 94% corresponds to an opalin.

The composition of the present invention provides a coating having a textured surface, the gloss value of which as defined before is between about 5 and about 60%, more particularly, between about 5 and about 35%.

The surface of the resulting coating exhibits a structure which is different from what is usually called in the art an "orange peel" and what is due to a poor tension of the sheet. In comparison with the composition according to the present invention, if all other conditions are the same, the prior art coatings which contain a system resin-cross-linking agent as a binder but does not contain an organometal salt as defined above, exhibit a gloss value of between 75 and 85% in a white color, which may decrease to 65% in the case of an "orange peel" and poor tension of the paint film, whereby the aspect of the surface is wrinkly and not textured as it is in the case of the compositions according to the present invention.

The invention will now be further demonstrated by the following non-limiting examples, which are representative only and wherein the amounts are expressed in parts by weight, unless stated otherwise.

EXAMPLE 1

Preparation of cross-linking resins (A) Preparation of polyester resins (resin [A]):

In the Table I below, the molar composition of various resins which were used within the compositions according to the present invention, their acid number, their hydroxyl number and their melting point are given.

The resins were prepared according to conventional methods, e.g., by reacting the components at a temperature of 200° C. under nitrogen atmosphere, until the product showed the desired analytical data. Then the resins were continuously poured onto a cooled metal band in a layer of 4 mm thickness and the resulting sheets were coarsely ground.

(B) Preparation of the crystallized resin (resin [A]):

100 parts of a resin [A] were molten at 200° C. in a reactor, then 0.6 parts of asbestos were incorporated. After homogenizing the mixture, the resin was poured into metal boxes in a layer of 50 mm thickness, and the boxes were kept in an oven at a temperature of 120° C. for 5 hours. After this thermal crystallizing treatment, the resulting resin, which was infusible at 150° C., was crushed and coarsely ground.

TABLE I (Compositions and analytical data of the polyester resins which are used within the composition)

| | Components (parts by moles) | | | | | | Characteristics of the resins | | |
|---|---|---|---|---|---|---|---|---|---|
| Resin | Terephthalic acid | Trimellitic acid anhydride | Ethylene glycol | Propylene glycol | Neopentyl glycol | Trimethylol propane | Penta erythritol | Acid number | Hydroxyl number | Melting point (°C.) |
| A | 1 | 0.33 | 2 | | | | | ≦5 | 150 | 78 |
| A1 | 1 | 0.33 | 2 | | | | | ≦5 | 150 | 160 |
| B | 1 | | | 1 | | 0.33 | | ≦5 | 180 | 75 |
| C | 1 | | | 1.15 | | | 0.15 | ≦5 | 180 | 85 |
| D | 1 | | | | 1 | 0.07 | | ≦5 | 50 | 101 |

(C) Preparation of cross-linking agents wherein the functional groups are an anhydride:

The following two cross-linking agents (Products E and F of Table II below) were prepared.

Table II composition of a cross-linking agent containing anhydride groups.

TABLE II

| | Cross-linking agent E | Cross-linking agent F |
|---|---|---|
| trimellitic acid anhydride | 3 moles | 2 moles |
| ethylene glycol | 1.5 moles | 1.5 moles |

The trimellitic acid anhydride was first introduced into a reactor which had previously been swept with nitrogen, then the ethylene glycol was progressively added whilst maintaining the temperature in the reactor by means of external cooling. Two hours after the addition had been completed, the water formation had stopped. The resulting product was cooled and ground.

The analytical data of the products are given in the following Table III:

Table III analytical data of cross-linking agents containing anhydride groups.

TABLE III

| | Cross-linking agent E | Cross-linking agent F |
|---|---|---|
| acid number in aqueous medium | 513 | 403 |
| acid number in alcoholic medium | 264 | 250 |
| melting point (ball-and-ring) | 110° C. | 115° C. |

(D) As a cross-linking agent wherein the functional groups are masked isocyanate groups, the commercial product ADDUCT B 1065* was used. The melting point of this cross-linking agent (product G) is 80° C.

*A reaction product of isophoron diisocyanate, manufacturer Societe VEBA, (2 moles) and diethylene glycol (1 mole) and subsequent reaction of the thus obtained product (1 mole) and ε-caprolactam (2 moles).

EXAMPLE 2

In this example, the following powderous painting compositions were prepared, the compositions of which are given in Table IV below.

TABLE IV (Painting compositions)

| | Composition (°C.) | | | | | | | |
|---|---|---|---|---|---|---|---|---|
| Components | 1 | 2 | 3 | 4 | 5 | 6 | 7 | 8 |
| Resin A | 90 | 90 | 90 | 90 | — | — | — | — |
| Resin B | — | — | — | — | 100 | 100 | 100 | 100 |
| Resin A1 Reticulant | 10 | 10 | 10 | 10 | | | | |
| E | 28 | 28 | 28 | 28 | 42 | 42 | 42 | 42 |
| TiO₂ rutile* | 80 | 80 | 80 | 80 | 80 | 80 | 80 | 80 |
| Zinc stearate** | 0 (Comparison) | 6 | 8 | 10 | 0 (Comparison) | 6 | 3 | 10 |
| Spreading agent*** | 1 | 1 | 1 | 1 | 1 | 1 | 1 | 1 |

*titanium oxide rutile: tradename KRONOS CL 220, manufacturer Societe Industrielle du Titane.
**zinc stearate CA, manufacturer Societe ROUSSELOT.
***Modaflow, manufacturer MONSANTO.

The powderous components were thoroughly mixed then the mixture was extruded on an extrusion mixer (tradename, BUSS) at a temperature of 100° C. The mixture was then cooled, finely ground, and then passed through a sieve of a 100 micron mesh size.

The resulting powder was applied to a (previously de-fatted) steel plate of a 200 cm×10 cm×0.8 cm size by means of an electrostatical pistol (tradename, SAMES). The plate was subsequently heated to 200° C. in an oven for 20 minutes.

After cooling, the following properties of the paint film were determined:

impact resistance: determined according to the standard method NFT 30039;

Erichsen beating resistance: determined according to the standard method NFT 30019;

elongation ASTM: determined according to the standard method ASTM D 522-60 for testing the elongation of an attached organic coating with a conical mandrel apparatus;

hardness Persoz (seconds): determined according to the standard method NFT 30016;

hardness Persoz after solvent treatment: the Persoz hardness is determined after immersing the sample for one hour in trichloroethylene (indicated by an asterisk in the following Table V), or in methylethyl ketone (indicated by two asterisks in the following Table V);

MEK-test: one drop of methylethyl ketone is deposited onto the coating, this spot is scratched with a nail, and the time which is needed to remove the coating is determined;

gloss: the gloss value is determined by means of a Gardner Laboratories' apparatus under light incidence of 60° and is expressed as percent ratio reflected intensity/intercity of incident light (standard method ASTM D 523 for testing the specular gloss).

The test results are given in Table V below.

present invention exhibited a good behavior with regard to their mechanical properties.

COMPARATIVE EXAMPLE 2

In this example, the following compositions were used:

| | |
|---|---|
| Resin A | 100 parts |
| Resin B | 10 parts |
| Cross-linking agent E | 30.8 parts |
| Zinc carbonate | 1.4 parts |
| TiO₂ rutile* | 33 parts |
| Spreading agent*** | 1.1 parts |

*titanium oxide rutile: tradename KRONOS CL 220, manufacturer Societe Industrielle du Titane.
***Modaflow, manufacturer MONSANTO.

A painting composition was prepared and used ac-

TABLE V (Test Results) Properties of the coating

| Compositions | Thickness of the film μ | Impact kg/cm | Erichsen mm | Folding Elongation (%) | ASTM φ mm | Hardness Persoz seconds | Hardness Persoz solvent | MEK | Gloss (%) |
|---|---|---|---|---|---|---|---|---|---|
| (Comparison) | | | | | | | | | |
| 1 | 50 | 4 | 2.5 | — | — | 250 | 130*/53** | >3 | 82 |
| 2 | 52 | 8.0 | 6.0 | >32 | <3 | 143/151 | 147*/125** | >3 | 14 |
| 3 | 60 | 10 | 6.1 | >32 | <3 | 146/149 | 143*/72** | >3 | 12 |
| 4 | 60 | 20 | 2.0 | 6.0 | 19.1 | 140/140 | 163*/25** | >3 | 5 |
| (Comparison) | | | | | | | | | |
| 5 | 50 | 10 | 2.8 | — | — | 250 | 205*/98** | >3 | 93 |
| 6 | 65 | 50 | 3.2 | 10.3 | 13.6 | 102/160 | 200*/65** | >3 | 44 |
| 7 | 55 | 23 | 3.5 | 11.1 | 13.4 | 157/150 | 229*/80** | >3 | 59 |
| 8 | 44 | 50 | 4.2 | 13.0 | 13.0 | 167/179 | 176*/83** | >3 | 34 |

All of the coatings comprising a composition according to the present invention exhibited a textured, non-glossy surface.

Furthermore, a powderous painting composition containing only resin A (and no crystallized resin A1) provided a gloss value of 40%, if 6 parts of zinc stearate are added per 100 parts of resin A, whereas in a composition which did not contain any zinc stearate, the resin A provided a gloss value of 80%.

From comparing these results, it can be seen how the addition of a metal salt influenced the loss in gloss and the formation of a textured coating as compared with the two comparative samples which did not contain the salt. Furthermore, it can be seen in particular how strongly the combination of a metal salt and a crystallized resin influenced the decrease in gloss. It can equally be seen that the composition according to the cording to Example 2. In this composition, the content in zinc metal in the form of zinc carbonate corresponded to that of the compositions 2 and 6 of Example 2. The coating which was prepared from the above composition provided a gloss value of 62%, and its surface was not textured.

EXAMPLE 3

According to the method described in Example 1, powderous painting compositions were prepared from the components listed in Table VI below.

Also listed in Table VI are the gloss values, in percentages, which were provided by the coatings which were obtained from the given compositions when they were prepared and used according to the method described in Example 2.

TABLE VI

Painting compositions

| Compositions n° | 9 | 10 | 11 | 12 | 13 | 14 | 15 | 16 | 17 | 18 | 19 |
|---|---|---|---|---|---|---|---|---|---|---|---|
| Resin A | 100 | | | | | | 100 | 100 | 100 | | 100 |
| Resin B | | | | | 100 | | | | | | |
| Resin C | | 100 | 100 | 100 | | | | | | | |
| Resin D | | | | | | | | | | | |
| Resin A1 | | | | | | 100 | 10 | 10 | 50 | 100 | 10 |
| Cross-linking agent E | 28 | 30 | 30 | | 30 | 28 | 30 | 30 | 42 | 28 | 30 |
| Cross-linking agent F | | | | 41 | | | | | | | |

TABLE VI-continued

| | Painting compositions | | | | | | | | | | |
|---|---|---|---|---|---|---|---|---|---|---|---|
| | Compositions n° | | | | | | | | | | |
| | 9 | 10 | 11 | 12 | 13 | 14 | 15 | 16 | 17 | 18 | 19 |
| Zinc stearate* | | | 6 | 6 | 6 | 6 | | | | | |
| Calcium stearate | | | | | | | | 6 | 9 | | |
| Magnesium stearate | | | | | | | | | | | 6 |
| Lead stearate | | | | | | | 6 | | | | |
| TiO₂ rutile** | 80 | 80 | 80 | 80 | 80 | 80 | 88 | 88 | 120 | 80 | 88 |
| Spreading agent*** | 1 | 1 | 1 | 1 | 1 | 1 | 1.1 | 1.1 | 1.5 | 1 | 1.1 |
| Gloss (%) | 80 | 86 | 58 | 30 | 40 | 7 | 26 | 28 | 10 | 80 | 50 |

*titanium oxide rutile: tradename KRONOS CL 220, manufacturer Societe Industrielle du Titane.
**zinc stearate CA, manufacturer Societe ROUSSELOT.
***Modaflow, manufacturer MONSANTO.

All of the coatings which were obtained from the compositions according to the present invention exhibited a textured surface, whereas the comparative compositions, Nos. 9, 10 and 18, exhibited gloss values which were superior to the specified range.

EXAMPLE 4

A powderous painting composition was prepared from the following components:

| Araldite 6071++ | 100 parts |
|---|---|
| Cross-linking agent E | 20 parts |
| Zinc stearate* | 6 parts |
| TiO₂ rutile** | 80 parts |
| Spreading agent*** | 1 part |

++commercial product, manufacturer Societe PROCHAL
*, , *see footnotes of Table IV.

The composition was prepared and used according to the method described in Example 2. A film of paint with a mat surface which provided a gloss value of 17% was obtained, whereas a comparative composition containing the same components except for the zinc stearate yielded a coating which provided a gloss value of 85%.

EXAMPLE 5

Two powderous coating compositions were prepared from the following components.

TABLE VII

| | Compositions N° | |
|---|---|---|
| | 20 | 21 |
| Resin A | 100 parts | — |
| Resin D | | 75 parts |
| Cross-linking agent G | 100 parts | 28 parts |
| Zinc Stearate* | 6 parts | 6 parts |
| TiO₂ rutile** | 80 parts | 80 parts |
| Spreading agent*** | 1 part | 1 part |

*, , *see footnotes of Table IV.

The compositions were prepared and used according to the methods described in Example 2. Coatings with a mat and textured surface were obtained which provided a gloss value of 10% in the case of the composition 20 and of 11% in the case of the composition 21.

EXAMPLE 6

A powderous coating composition was prepared from the following components:

| Resin B | 100 parts |
|---|---|
| Cross-linking agent F | 41 parts |
| Zinc Stearate* | 6 parts |
| TiO₂ rutile** | 80 parts |
| Spreading agent*** | 1 part |

*, , *see footnotes of Table IV.

The composition was prepared and used according to the method described in Example 2. The resulting coating had a mat, textured surface which provided a gloss value of 30%, whereas the same composition, but without zinc stearate, yielded a gloss value of 80%.

EXAMPLE 7

This example demonstrates the use of aluminum acetylacetonate as a metal compound of an organic acid wherein the valence of the metal ion is above 2.

As a saturated cross-linkable resin, resin A of Example 1 was used and as a fraction infusible at 150° C., the resin A1 of Example 1 was used. As a cross-linking agent, the cross-linking agent E of Example 1 was used.

(A) Preparation of the coating composition:

A mixture having the following compositions was prepared by mixing the components in a rapid mixer (tradename Henschel) at a temperature not exceeding 30° C. during 5 minutes:

| Polyester resin A prepared according to Example 1A above | 100 parts |
|---|---|
| Polyester resin A1 prepared according to Example 1B above | 10 parts |
| Cross-linking agent E prepared according to Example 1C above | 31 parts |
| Aluminum acetyl acetonate**** | 6.6 parts |
| Titanium oxide rutile** | 88 parts |
| Spreading agent*** | 1.1 parts |

, *see footnotes of Table IV
****pur, manufacturer Societe Mac Kenzie

The resulting mixture was transferred into an extrusion mixer (tradename BUSS) and extruded at a temperature of about 100° C. The mixture was then crushed, ground, and passed through a sieve for recovering the particles which pass through an Afnor sieve having a 100 micron mesh size.

(B) Preparation of the coating on a metal:

By means of an electrostatical pistol (tradename SAME) the powderous paint composition which was prepared under A above was applied to a de-fatted steel plate of a 20 cm×10 cm×0.08 cm size in such an amount that the thickness of the coating is 50 micron after baking. Then, the coated plate was heated in an oven at 200° C. for 30 minutes.

The gloss value which was determined according to the method of Gardner under light incidence of 60°, was 30%, and the mechanical properties and the adherence were satisfactory.

For comparison, a coating was prepared according to the same process but without incorporating the aluminum acetylacetonate, this comparative coating exhibited a gloss value according to Gardner under a 60° incidence of 82%.

EXAMPLE 8

In this example, the condensate B of Example 1 was used as a polyester resin.

According to the method described in the preceding examples, a powderous painting composition was prepared from the following components:

| | |
|---|---|
| Resin B of Example 1 | 100 parts |
| Crystallized resin B1 prepared according to Example 1B | 10 parts |
| Cross-linking agent E prepared according to Example 1C | 40 parts |
| Aluminum acetylacetonate**** | 7 parts |
| Titanium oxide rutile** | 88 parts |
| Spreading agent*** | 1.1 parts |

, *see footnotes of Table IV
****see footnotes of Example 7

This composition was applied to the metal as described in the preceding examples. The gloss value of the resulting coating which was determined according to the method of Gardner under light incidence of 60°, was 31%. The gloss value of an identical composition, yet without aluminum acetylacetonate, was 82% under 60° incidence.

EXAMPLE 9

This example demonstrates the embodiment of the invention wherein the metal compound of an organic acid and a bivalent metal ion is obtained by reacting a cross-linking agent with a reactive inorganic compound of the bivalent metal.

In this example, resin A of Example 1 was used as a saturated cross-linkable resin, resin A1 of Example 1 as the fraction infusible at 150° C., and the cross-linking agent E of Example 1 as a cross-linking agent wherein the functional groups are anhydride groups.

(A) Preparation of a reaction product of the cross-linking agent and magnesium oxide. (modified cross-linking agent):

100 parts of the cross-linking agent were introduced into a reactor comprising an agitating means and a heating means and were heated and molten at 180° C. Then, 5.5 parts of calcinated magnesia were added and agitated and heated to the above temperature for one hour. The resulting product was poured onto plates cooled, and crushed.

(B) Preparation of the coating composition:

The dry mixture having the following composition was prepared by mixing the components in a rapid mixer (tradename Henschel) at a temperature not exceeding 30° C. during 5 minutes:

| | |
|---|---|
| Polyester resin A prepared according to Example 1A above | 100 parts |
| Polyester resin A1 prepared according to Example 1B above | 10 parts |
| Modified cross-linking agent E of Example 1C above prepared according to the foregoing A | 32.4 parts |
| Titanium oxide rutile** | 88 parts |
| Spreading agent**** | 1.1 parts |

, *see footnotes of Table IV.

The resulting mixture was transferred into an extrusion mixer (tradename BUSS) and extruded at a temperature of about 100° C. The mixture was then crushed, ground, and passed through a sieve for recovering the particles which pass through an Afnor sieve having a 100 micron mesh size.

(C) Preparation of the coating on a metal:

By means of an electrostatical pistol (tradename SAME) the powderous paint composition which was prepared under B above was applied to a de-fatted steel plate of a 20 cm × 10 cm × 0.08 cm size in such an amount that the thickness of the coating was 50 micron after baking. Then, the coated plate was heated in an oven at 200° C. for 30 minutes.

The gloss value which was determined according to the method of Gardner under light incidence of 60° was 24%, and the mechanical properties and the adherence were satisfactory.

For comparison, a coating was prepared according to the same process, but incorporating an unmodified cross-linking agent E instead of the modified cross-linking agent. This comparative coating exhibited a gloss value according to Gardner under 60° incidence of 82%.

EXAMPLE 10

Like Example 9, this example demonstrates the use of the cross-linking agent which has been modified by reaction with a magnesium compound and comprises magnesium-carboxylate groups.

In this example, the condensate B of Example 1A was used as a polyester resin.

According to the method described in the preceding example, a powderous painting composition was prepared from the following components:

| | |
|---|---|
| Resin B of Example 1A | 100 parts |
| Crystallized resin A1 prepared according to Example 1B | 100 parts |
| Reaction product of the cross-linking agent E of Example 1C and magnesium oxide prepared according to A of the preceding example | 32.5 parts |
| Titanium oxide rutile** | 88 parts |
| Spreading agent*** | 1.1 parts |

, *see footnotes of Table IV.

This composition was applied to the metal as described in the preceding example. The gloss value of the resulting coating which was determined according to the method of Gardner under light incidence of 60° was 45%. The gloss value of an identical composition, yet containing the non-modified cross-linking agent E, is 82% under 60° incidence.

EXAMPLE 11

In this example, the saturated crystallizable resin A of Example 1A, the saturated crystallized fraction A1 of Example 1B and the cross-linking agent E of Example 1C were used. The cross-linking agent was reacted with calcium hydroxide which was obtained by drying slaked lime for 2 hours at 120° C. as follows:

100 parts of the cross-linking agent according to Example 1C were introduced into a reactor comprising an agitating means and a heating means and were molten at 180° C. Then, 9 parts of dried calcium hydroxide as mentioned above were added and agitated and heated to the above temperature for one hour. The resulting product was poured into plates, cooled, and crushed.

In a powder mixer having a V-shaped, the following components are thoroughly mixed in dry form:

| | |
|---|---|
| Polyester resin A prepared according to Example 1A | 100 parts |
| Polyester resin A1 prepared according to Example 1B | 10 parts |
| Reaction product of the cross-linking agent E and calcium hydroxide, prepared as described above | 33.5 parts |
| Titanium oxide rutile** | 88 parts |
| Spreading agent*** | 1.1 parts |

, *see footnotes of Table IV.

The above mixture was treated as is described in Example 1, in order to obtain a coating on a metal plate. Its gloss value which was determined by the method of Gardner under light incidence of 60° was 20%. The Gardner gloss value under light incidence of 60° of a coating which was obtained from an identical composition, yet containing the non-modified cross-linking agent, under otherwise equal conditions was 82%.

What is claimed is:

1. A powderous homogeneous saturated binder composition of matter adapted for coatings having a non-glossy surface comprising:
   (a) at least one cross-linkable epoxide resin;
   (b) a sufficient amount of a cross-linking agent therefor having functional groups selected from the group consisting of acid groups and acid anhydride groups; and,
   (c) a catalytic amount of a salt of an at least bivalent metal ion and an organic anion selected from the group consisting of carboxylic anions and acetylacetonate.

2. The composition as defined in claim 1, wherein the amount of cross-linking agent is such that the number of functional groups therein is about stoichiometrically equivalent to the number of reactive groups within the cross-linkable resin.

3. The composition as defined in claim 1 wherein the cross-linkable resin has a melting point of between about 50° and about 130° C.

4. The composition as defined in claim 1, wherein the cross-linkable resin is an epoxide resin which is a reaction product of a diphenol and an epihalohydrine having an epoxy value of between about 400 and about 1,500, and a melting point of between about 50° and about 120° C.

5. The composition as defined in claim 1, wherein the cross-linking agent has a melting point of between about 70° and about 130° C.

6. The composition as defined in claim 1 wherein the cross-linking agent is an agent wherein the functional groups comprise acid- and acid anhydride groups, and which is a reaction product of trimellitic acid anhydride and a diol containing 2 to 8 carbon atoms, wherein the molar ratio between the trimellitic acid anhydride and the diol is from about 2:1 to about 2:1.8.

7. The composition as defined in claim 1, wherein the salt of the at least bivalent metal ion and the organic acid anion is a salt wherein the organic acid anion is derived from a carboxylic acid containing from 2 to about 25 carbon atoms or from acetylacetonic acid and which is mixed with the cross-linkable resin and the cross-linking agent.

8. The composition as defined in claim 7, wherein the organic acid anion comprises from about 6 to about 22 carbon atoms.

9. The composition as defined in claim 8, wherein the organic acid anion is selected from the group consisting of undecanoate, stearate, phthalates, naphthenates and acetylacetonate.

10. The composition as defined in claim 1, wherein the organic acid anion of the salt of the at least bivalent metal is derived from at least part of the cross-linking agent wherein the functional groups comprise acid- and acid anhydride groups.

11. The composition as defined in claim 10, wherein the salt of the at least bivalent metal anion has been obtained by reacting an inorganic active compound of the metal with at least part of the cross-linking agent.

12. The composition as defined in claim 11, wherein the inorganic active metal compound is the oxide or the hydroxide of the metal.

13. The composition as defined in claim 1, wherein the at least bivalent metal ion is derived from a metal selected from the group consisting of calcium, zinc, magnesium, lead, and aluminum.

14. The composition as defined in claim 1, wherein the by weight ratio between the at least bivalent metal and the cross-linkable saturated resin is between about 0.1:100 and 1.5:100.

15. The composition as defined in claim 14, wherein the by weight ratio between the at least bivalent metal and the cross-linkable saturated resin is between about 0.3:100 and about 1.0:100.

16. The compositions as defined by claim 1, further comprising an adjuvant selected from the group consisting of fillers, spreading agents, catalysts, coloring agents, pigments and admixtures thereof.

17. A coating composition comprising the composition of matter as defined by claim 16.

18. The coating composition as defined by claim 17, which comprises a powder paint.

19. A polymer comprising the cross-linked reaction product of the composition of matter as defined by claim 1.

20. A coated substrate, the coating comprising the cross-linked polymer as defined by claim 19.

21. A process for preparing the composition of matter defined by claim 1, which comprises the steps of:
   (a) mixing the components to form a powdery mixture;
   (b) heating the resulting mixture to a temperature sufficiently high to form a liquid mixture which is below the temperature at which the cross-linking reaction occurs;
   (c) cooling the resulting liquid mixture to form a solid mixture; and,
   (d) grinding the solid mixture into a powder.

22. The process as defined in claim 21, wherein the organic acid anion of the salt component is derived from a cross-linking agent the functional groups of which are selected from the group consisting of acid- and acid anhydride groups, and which further comprise the steps of reacting at least part of the cross-linking agent with an active inorganic compound of the at least bivalent metal at a temperature of between about 170° and about 220° C.

23. The process as defined in claim 22, wherein the reaction is effected for a period of between about 1 and about 3 hours.

24. The process as defined in claim 22, wherein the active inorganic compound is a hydroxide or an oxide.

* * * * *